United States Patent [19]

Arnost et al.

[11] Patent Number: 5,691,458
[45] Date of Patent: Nov. 25, 1997

[54] BENZOISOTHIAZOLE AZO DYES

[75] Inventors: Michael J. Arnost, Andover; Peter Viski; David P. Waller, both of Lexington; David C. Whritenour, Franklin, all of Mass.

[73] Assignee: Polaroid Corporation, Cambridge, Mass.

[21] Appl. No.: 715,454

[22] Filed: Sep. 18, 1996

[51] Int. Cl.$^6$ .................. C09B 29/042; C09B 29/28; C09B 29/36; D06P 1/18
[52] U.S. Cl. .................. 534/774; 534/788; 106/22 K; 430/235
[58] Field of Search ..................... 534/788, 774

[56] References Cited

U.S. PATENT DOCUMENTS

| | | | |
|---|---|---|---|
| 3,415,644 | 12/1968 | Land | 96/3 |
| 3,455,898 | 7/1969 | Seefelder et al. | 534/788 |
| 3,573,273 | 3/1971 | Seefelder et al. | 534/788 |
| 3,658,784 | 4/1972 | Lange et al. | 534/788 |
| 3,719,489 | 3/1973 | Cieciuch et al. | 96/29 D |
| 3,761,462 | 9/1973 | Moritz et al. | 534/788 X |
| 3,919,188 | 11/1975 | Hagen et al. | 534/788 |
| 3,942,987 | 3/1976 | Landholm et al. | 96/73 |
| 4,098,783 | 7/1978 | Cieciuch et al. | 260/147 |
| 4,268,625 | 5/1981 | Fujita et al. | 430/562 |
| 4,273,708 | 6/1981 | Kilminster et al. | 260/199 |
| 4,374,767 | 2/1983 | Weaver et al. | 260/158 |
| 4,374,768 | 2/1983 | Fleischer et al. | 260/158 |
| 4,556,632 | 12/1985 | Sato et al. | 430/562 |
| 4,698,651 | 10/1987 | Moore et al. | 503/227 |
| 5,187,265 | 2/1993 | Albarella et al. | 534/573 |
| 5,223,387 | 6/1993 | Tsukase et al. | 430/562 |
| 5,316,887 | 5/1994 | Arnost et al. | 430/203 |
| 5,436,108 | 7/1995 | Freedman et al. | 430/200 |
| 5,554,483 | 9/1996 | DeNoto et al. | 430/237 |
| 5,567,470 | 10/1996 | Koshida et al. | 534/788 X |

FOREIGN PATENT DOCUMENTS

| | | | |
|---|---|---|---|
| 2716033 | 10/1978 | Germany | 534/788 |
| 63-6057 | 1/1988 | Japan | 534/788 |
| 2036809 | 2/1980 | United Kingdom | 534/788 |

*Primary Examiner*—Floyd D. Higel
*Attorney, Agent, or Firm*—Jennifer A. Kispert

[57] ABSTRACT

There are described compounds which are represented by the formula

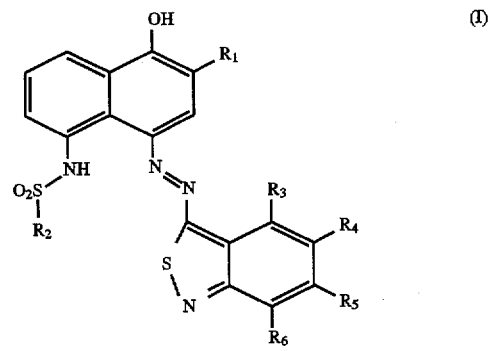

The compounds are useful as dyes, and as intermediates and dye moieties in the preparation of compounds, which are particularly useful in imaging applications, such as, for example, diffusion transfer photographic systems.

7 Claims, No Drawings

BENZOISOTHIAZOLE AZO DYES

BACKGROUND OF THE INVENTION

This invention relates generally to novel compounds and, more particularly, to compounds which are useful as dyes and as intermediates for the preparation of compounds which are useful in imaging applications.

It is therefore the object of this invention to provide novel compounds.

It is another object to provide novel compounds which are useful as dyes.

It is a further object to provide novel compounds which are useful as intermediates for the preparation of compounds which are useful in imaging systems.

It is a further object to provide novel naphthol azo cyan dyes having a 3-aminobenzoisothiazole moiety as the diazo moiety.

SUMMARY OF THE INVENTION

These and other objects and advantages are accomplished in accordance with the invention by providing novel compounds which are represented by formula (I)

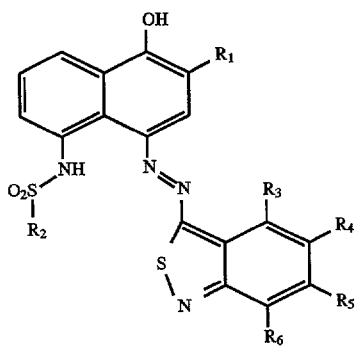

wherein:

$R_1$ is:

(1) $SO_2NR_7R_8$ wherein $R_7$ and $R_8$ are independently hydrogen; linear or branched alkyl ($C_nH_{2n+1}$) wherein n is an integer from 1 to 6; alkyl substituted with
(a) hydroxy,
(b) alkoxy having from 1 to 6 carbon atoms,
(c) halogen,
(d) sulfamoyl such as

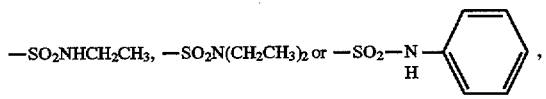

(e) sulfonamido such as

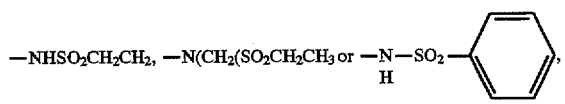

(f) carboxy, (g) carbamoyl such as

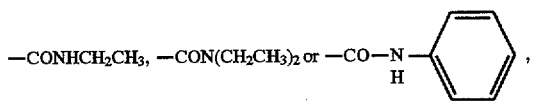

(h) carboxamido such as

—NHCOCH$_2$CH$_3$ or —N(CH$_3$)COCH$_2$CH$_3$, (i) carboxylic ester such as

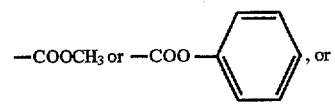

(j) sulfo;
cycloalkyl such as cyclohexane; benzyl; phenyl; phenyl substituted with hydroxy, alkoxy having from 1 to 6 carbon atoms or a substituent such as described in (1)(c)–(1)(d) and (1)(f)–(1)(j); a heterocyclic group such as furan, pyridine or triazine; a heterocyclic group substituted with alkyl having from 1 to 6 carbon atoms, or, a substituent such as described in (1)(d), (1)(f)–(1)(g) and (1)(i)–(1)(j); or, taken together, along with the nitrogen atom to which they are attached, form a 5- or 6-membered ring such as morpholino or piperidino; or (2) $R_9NCOR_{10}$ wherein $R_9$ is hydrogen; alkyl having from 1 to 6 carbon atoms; or, alkyl substituted with hydroxy or alkoxy having from 1 to 4 carbon atoms; and $R_{10}$ is hydrogen; alkyl having from 1 to 6 carbon atoms; alkyl substituted with hydroxy, alkoxy having from 1 to 6 carbon atoms, halogen, carboxy or a substituent such as described in (1)(d)–(1)(e) and (1)(g)–(1)(j); cycloalkyl such as cyclohexane; benzyl; phenyl; phenyl substituted with hydroxy, alkoxy having from 1 to 6 carbon atoms, halogen, carboxy or a substituent such as described in (1)(d) and (1)(g)–(1)(j); a heterocyclic group such as furan, pyridine or triazine; or, a heterocyclic group substituted with carboxy or a substituent such as described in (1)(d), (1)(g) and (1)(i)–(1)(j); or, alkyl having from 1 to 6 carbon atoms; and $R_2$ is alkyl having from 1 to 6 carbon atoms; alkyl substituted with hydroxy, alkoxy having from 1 to 6 carbon atoms, halogen, carboxy or a substituent such as described in (1)(d)–(1)(e) and (1)(g)–(1)(j); benzyl; phenyl; or, phenyl substituted with hydroxy, alkoxy having from 1 to 6 carbon atoms, halogen, carboxy or a substituent such as described in (1)(d) and (1)(g)–(1)(j); and $R_3$, $R_5$ and $R_6$ are independently: hydrogen; halogen; or, alkyl having from 1 to 4 carbon atoms; and $R_4$ is hydrogen; halogen; alkyl having from 1 to 4 carbon atoms; carboxy; alkylsulfonyl; phenylsulfonyl; or, a substituent such as described in (1)(d), (1)(g) and (1)(i)–(1)(j).

In a preferred embodiment of the present invention the 3-aminobenzoisothiazole moiety is the diazo moiety of an azo naphthol cyan dye. The use of the 3-aminobenzoisothiazole as the diazo moiety of the azo naphthol cyan dye renders the diazo moiety strongly electron deficient, resulting in the $\lambda_{max}$ of the azo naphthol cyan dye being at the desired wavelength, specifically, from about 620 to about 665 nm, with excellent hue characteristics.

These and other objects and advantages which are provided in accordance with the invention will in part be obvious and in part be described hereinafter in conjunction with the detailed description of various preferred embodiments of the invention. The invention accordingly comprises the processes involving the several steps and relation and order of one or more of such steps with respect to each of the others, and the product and compositions possessing the features, properties and relation of elements which are exemplified in the following detailed disclosure, and the scope of the application of which will be indicated in the claims.

For a fuller understanding of the nature and objects of the invention, reference should be had to the following detailed description of the preferred embodiments.

DETAILED DESCRIPTION OF THE PREFERRED EMBODIMENTS

Illustrative examples of specific compounds within the scope of formula (I) are represented by formulae (1)–(14):

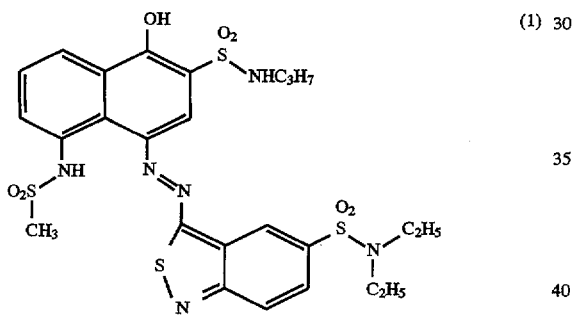
(1)

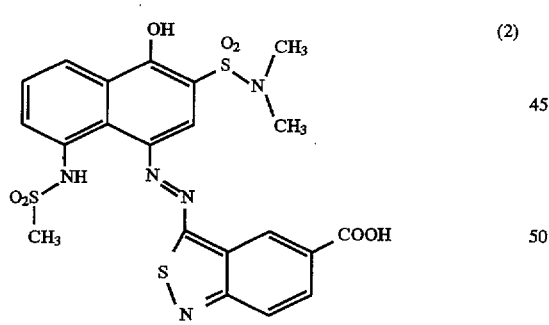
(2)

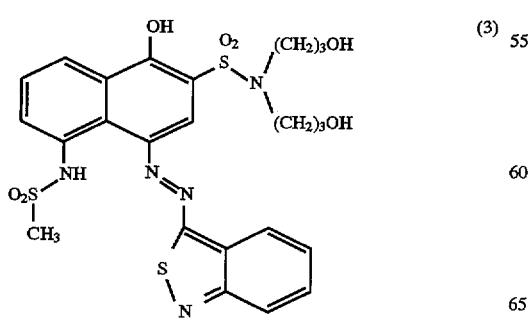
(3)

-continued

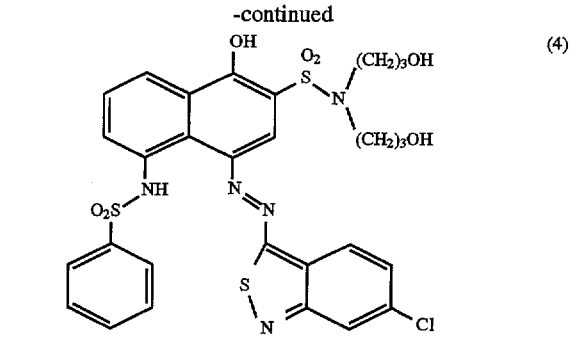
(4)

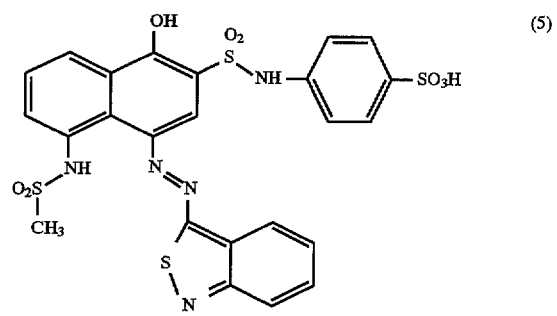
(5)

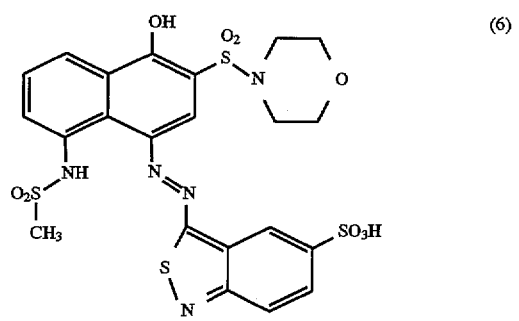
(6)

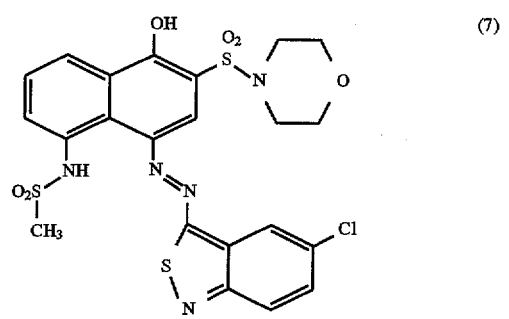
(7)

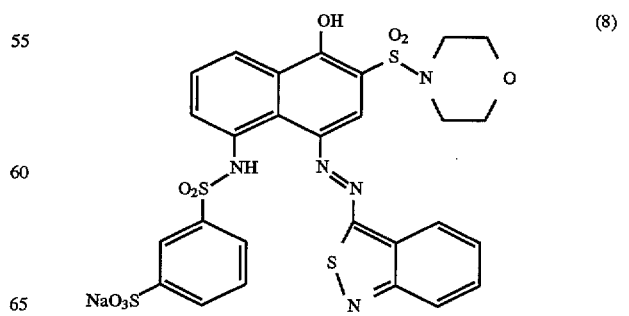
(8)

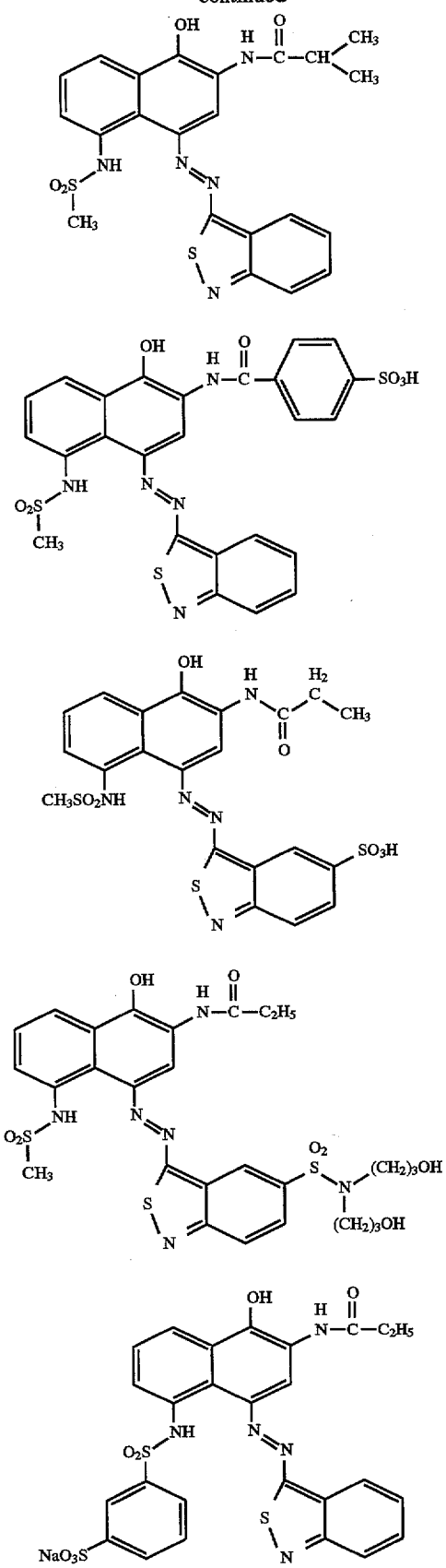

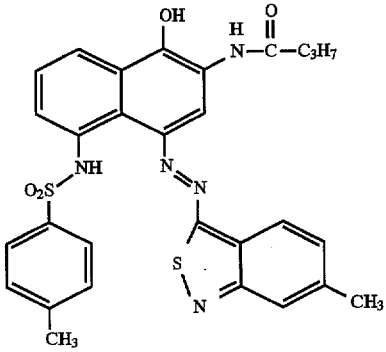

The novel dyes of the invention can be prepared according to techniques which are known in the art and these will be apparent particularly in view of the specific examples provided herein. The novel compounds of the invention are generally soluble in various solvents such as, for example, water, organic solvents, e.g., methylene chloride or methanol, or both.

As mentioned previously, the compounds of the present invention are useful as dyes and as intermediates and dye moieties in the preparation of-compounds which are useful in imaging applications. For example, the compounds within the scope of formula (I) may be employed as dye moieties in image dye-providing materials, such as, for example, disclosed and claimed in copending and commonly-assigned, U.S. pat. appln., Ser. No. 08/715,451, filed on even date herewith.

In addition, the novel dyes of the invention may be used in the textile industry to impart color to various materials such as nylon and polyester fibers by, e.g., dissolving the dyes in suitable solvents and applying the solutions to the materials by any of many well known techniques. The novel dyes of the invention may also be used as the imaging dyes for both inkjet printers and thermal dye transfer imaging materials and the like.

The invention will now be described further in detail with respect to specific preferred embodiments by way of examples, it being understood that these are intended to be illustrative only, and the invention is not limited to the materials, procedures, process parameters, conditions, amounts, etc. recited therein. All parts and percentages recited are by weight unless otherwise stated.

EXAMPLE I

Preparation of Compound (6)

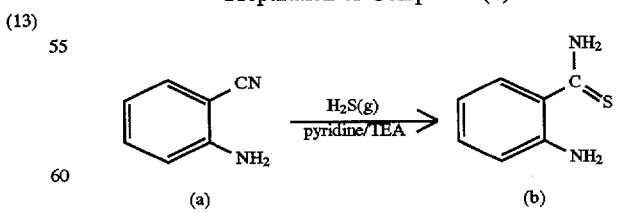

Compound (a), anthranilonitrile, (450 g, 3.81 mol, Aldrich), was dissolved in dry pyridine (500 mL) and dry triethylamine (TEA, 200 mL) in a flask. Hydrogen sulfide (g) was slowly bubbled into the reaction solution over a 3 hour (h) period which was then stirred overnight (O/N) at room temperature (RT). The reaction flask was purged under air for 3 to 4 h. The reaction solution was concentrated (2–3 h, 60° C.), transferred to a new flask, quenched into warm (45° C.) tap H₂O and stirred O/N at RT. The crystals were vacuum filtered, rinsed with water, pressed dry and air dried O/N. The air-dried weight of compound (b), thiobenzamide, was 464.7 g (81.9% yield). Mass spectroscopy by FAB⁺ (fast atom bombardment techniques) gave the expected molecular ion, m/e=153. Proton NMR (DMSO-d₆) was consistent with the proposed structure of compound (b). Thin layer chromatography (TLC) (2% MeOH/CH₂Cl₂, R_f=0.40) was consistent with compound (b).

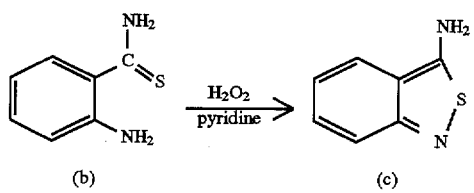

Compound (b) (464.7 g, 3.05 mol) was added to pyridine (450 mL). The suspension was chilled externally to 10° C. whereupon 30% H₂O₂ (418 mL, 3.66 mol, 20% molar excess) was added dropwise over 4–5 h while maintaining the reaction temperature of 10° C. The reaction solution was stirred O/N at RT. The solids were collected by vacuum filtration, rinsed with solvent (500 mL) and recrystallized (335 g, 71.5%) from toluene (2 L). The crystals were vacuum filtered, rinsed with H₂O, pressed dry and then air dried O/N. The air-dried weight of compound (c), 3-amino-2,1-benzisothiazole, was 297.8 g (65.0% yield). Mass spectroscopy by FAB⁺ gave the expected molecular ion, m/e= 151. Proton NMR (DMSO-d₆) was consistent with the proposed structure of compound (c). TLC (2% MeOH/ CH₂Cl₂, R_f=0.40) was consistent with compound (c).

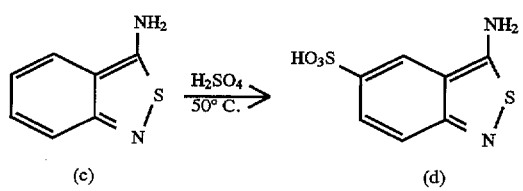

Compound (c) (8 g, 53.33 mmol) was dissolved in 18M H₂SO₄ (80 mL), warmed to 50° C. for 1 h, cooled, poured into cold acetone (500 mL), stirred for 20 minutes (min) and filtered (yielding 7 g of compound (d), 3-amino-2,1-benzisothiazole- 5-sulfonic acid). NMR and mass spectroscopy were consistent with the proposed structure of compound (d).

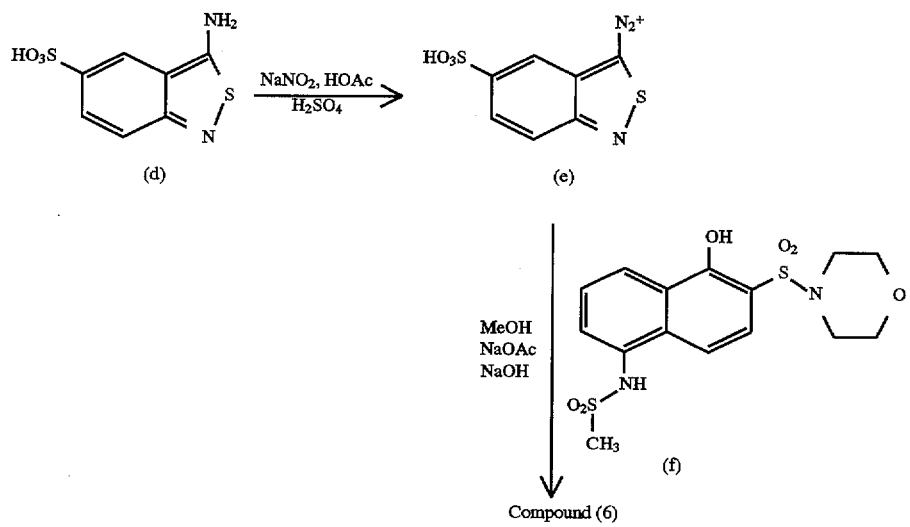

NaNO₂ (1.7 g) was added to 18M H₂SO₄ (25 mL). The mixture was heated to 70° C., cooled on ice to below 5° C. and propionic/acetic acid (1:5, 25 mL) added slowly so as to keep the temperature below 15° C. This temperature was maintained while compound (d) (7 g) was added over 10 min, followed by the addition of propionic/acetic acid (50 mL), resulting in compound (e). The mixture was stirred for 3 h at 0°–5° C., poured into a cold solution of compound (f), 2-(morpholinosulfamoyl)-5-methanesulfonamido-1-naphthol, (7.5 g), NaOAc (50 g), KOH (10 mL, 40% in MeOH) and H₂O (50 mL), stirred in an ice bath for 1 h and then, stirred at RT for several h. The mixture was acidified with 12M HCl, filtered and the solids (3 g) triturated with tetrahydrofuran (THF). NMR was consistent with the proposed structure of compound (6).

EXAMPLE II

Preparation of Compound (11)

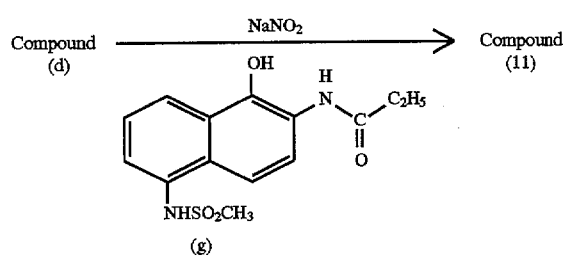

A solution of compound (d) (12 g, 52 mmol) and NaNO$_2$ (69 mmol, 4.3 g in 200 mL 5% NaOH (aq)) was added dropwise over 30 min to a 0° C. solution of 10% HCl (aq) (200 mL). The reaction mixture was stirred for 3 h at 0° C., added dropwise to a 0° C. solution of compound (g) (27 mmol, 8 g in 150 mL 10% NaOH$_{(aq)}$), stirred for 3 h at 25° C. and then added to a 0° C. mixture of saturated NaCl (aq) (100 mL) and 18M H$_2$SO$_4$ (50 mL). The precipitated solids were collected by suction filtration, washed with saturated NaCl (2×75 mL) and air-dried. The isolated product was triturated with hot ethyl acetate (2×100 mL) whereupon the remaining solids were air-dried. The dried weight of compound (11) was 16 g. NMR was consistent with the proposed structure of compound (11).

EXAMPLE III

Preparation of Compound (8)

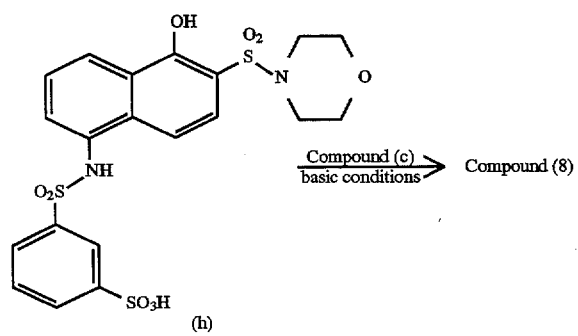

Compound (c) (2.5 g, 16.66 mmol) is added slowly to a solution of NaNO$_2$ (1.5 g in 18 mL of 18M H$_2$SO$_4$) at a temperature of below 5° C., stirred for 2 h while maintaining that temperature and poured into a chilled solution of 2-(morpholinosulfamoyl)-5(3-sulfobenzene)sulfonamido-1-naphthol, i.e., compound (h), (52 g compound (h) in 300 mL 50% NaOH (MeOH) and 50 mL H$_2$O). The precipitate was filtered off, washed with H$_2$O, air-dried, triturated with THF and dried. The dry weight of compound (8) was 1.5 g. The NMR and mass spectra were consistent with the proposed structure of compound (8).

EXAMPLE IV

Preparation of Compound (7)

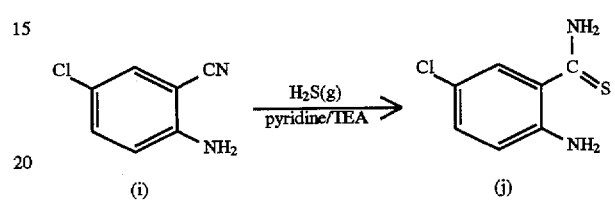

Compound (i) (450 g, 2.76 mol, Aldrich), was dissolved in dry pyridine (500 mL) and dry (TEA, 200 mL) in a flask. Hydrogen sulfide (g) was slowly bubbled into the reaction solution over 3 h and then, stirred O/N at RT. The reaction flask was purged under air for 3 to 4 h. The reaction solution was concentrated (2–3 h, 60° C.), transferred to a new flask, quenched into warm (45° C.) tap H$_2$O and stirred O/N at RT. The crystals (compound (j)) were vacuum filtered, rinsed with water, pressed dry and air dried O/N.

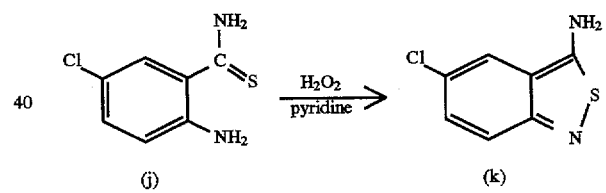

Compound (j) (450 g, 2.41 mol) was added to pyridine (450 mL). The suspension was chilled externally to 10° C. whereupon 30% H$_2$O$_2$ (418 mL, 3.66 mol, 20% molar excess) was added dropwise over 4–5 h while maintaining the reaction temperature of 10° C. The reaction solution was stirred O/N at RT. The solids were collected by vacuum filtration, rinsed with solvent (500 mL) and recrystallized (335 g) from toluene (2 L). The crystals (compound (k)) were vacuum filtered, rinsed with H$_2$O, pressed dry and then air dried O/N.

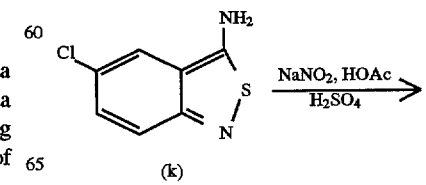

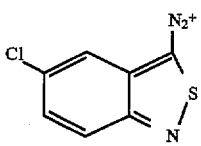

(l)

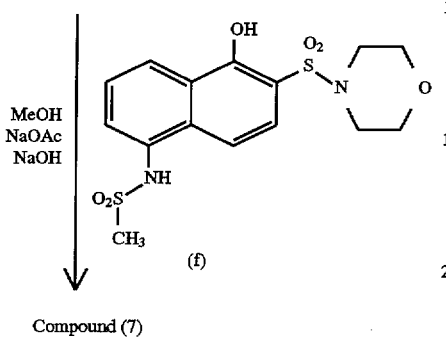

Compound (7)

NaNO$_2$ (1.7 g) was added to 18M H$_2$SO$_4$ (25 mL). The mixture was heated to 70° C., cooled on ice to below 5° C. and propionic/acetic acid (1:5, 25 mL) added slowly so as to keep the temperature below 15° C. This temperature was maintained while compound (k) (5.5 g) was added over 10 min, followed by the addition of propionic/acetic acid (50 mL), resulting in compound (l). The mixture was stirred for 3 h at 0°–5° C., poured into a cold solution of compound (f), 2-(morpholinosulfamoyl)-5-methanesulfonamido-1-naphthol, (7.5 g), NaOAc (50 g), KOH (10 mL, 40% in MeOH) and H$_2$O (50 mL), stirred in an ice bath for 1 h and then, stirred at RT for several h. The mixture was acidified with 12M HCl, filtered and the solids (3 g) triturated with THF yielding compound (7).

Although the invention has been described in detail with respect to various preferred embodiments thereof, those skilled in the art will recognize that the invention is not limited thereto but rather that variations and modifications can be made which are within the spirit of the invention and the scope of the appended claims.

What is claimed is:

1. A compound represented by the formula

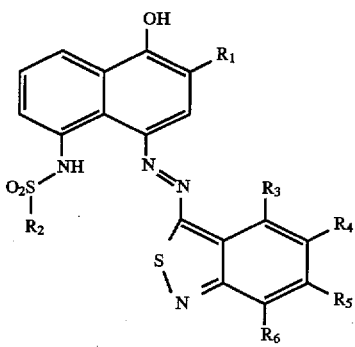

wherein:
R$_1$ is:

(1) SO$_2$NR$_7$R$_8$ wherein R$_7$ and R$_8$ are independently hydrogen; linear or branched alkyl (C$_n$H$_{2n+1}$) wherein n is an integer from 1 to 6; alkyl substituted with hydroxy, alkoxy having from 1 to 6 carbon atoms, halogen, sulfamoyl, sulfonamido, carboxy, carbamoyl, carboxamido, —COOCH$_3$, —COOC$_6$H$_5$ or sulfo; cycloalkyl; benzyl; phenyl; phenyl substituted with hydroxy, alkoxy having from 1 to 6 carbon atoms, halogen, sulfamoyl, carboxy, carbamoyl, carboxamido, —COOCH$_3$, —COOC$_6$H$_5$ or sulfo; furan; pyridine; triazine; a heterocyclic group substituted with sulfamoyl, carboxy, carbamoyl, —COOCH$_3$, —COOC$_6$H$_5$, sulfo or alkyl having from 1 to 6 carbon atoms; or, taken together, along with the nitrogen atom to which they are attached, form morpholino or piperidino; or (2) R$_9$NCOR$_{10}$ wherein R$_9$ is hydrogen; alkyl having from 1 to 6 carbon atoms; or, alkyl substituted with hydroxy or alkoxy having from 1 to 4 carbon atoms; and R$_{10}$ is hydrogen; alkyl having from 1 to 6 carbon atoms; alkyl substituted with hydroxy, alkoxy having from 1 to 6 carbon atoms, halogen, sulfamoyl, sulfonamido, carboxy, carbamoyl, carboxamido, —COOCH$_3$, —COOC$_6$H$_5$ or sulfo; cycloalkyl; benzyl; phenyl; phenyl substituted with hydroxy, alkoxy having from 1 to 6 carbon atoms, halogen, sulfamoyl, carboxy, carbamoyl, carboxamido, —COOCH$_3$, —COOC$_6$H$_5$ or sulfo; furan; pyridine; triazine; or, a heterocyclic group substituted with sulfamoyl, carboxy, carbamoyl, —COOCH$_3$, —COOC$_6$H$_5$, sulfo or alkyl having from 1 to 6 carbon atoms; and R$_2$ is alkyl having from 1 to 6 carbon atoms; alkyl substituted with hydroxy, alkoxy having from 1 to 6 carbon atoms, halogen, sulfamoyl, sulfonamido, carboxy, carbamoyl, carboxamido, —COOCH$_3$, —COOC$_6$H$_5$ or sulfo; benzyl; phenyl; or, phenyl substituted with hydroxy, alkoxy having from 1 to 6 carbon atoms, halogen, sulfamoyl, carboxy, carbamoyl, carboxamido, —COOCH$_3$, —COOC$_6$H$_5$ or sulfo; and R$_3$, R$_5$ and R$_6$ are independently hydrogen; halogen; or, alkyl having from 1 to 4 carbon atoms; and R$_4$ is hydrogen; halogen; alkyl having from 1 to 4 carbon atoms; sulfamoyl; carboxy; carbamoyl; —COOCH$_3$; —COOC$_6$H$_5$; sulfo; alkylsulfonyl; or, phenylsulfonyl.

2. A compound as defined in claim 1 wherein R$_1$ is SO$_2$NR$_7$R$_8$.

3. A compound as defined in claim 1 wherein R$_3$, R$_5$ and R$_6$ are hydrogen and R$_4$ is selected from the group consisting of hydrogen, chlorine and —SO$_3$H.

4. A compound as defined in claim 1 wherein R$_1$ is R$_9$NCOR$_{10}$.

5. A compound as defined in claim 4 wherein R$_3$, R$_5$ and R$_6$ are hydrogen and R$_4$ is selected from the group consisting of hydrogen, chlorine and —SO$_3$H.

6. A compound as defined in claim 1 selected from the group consisting of:

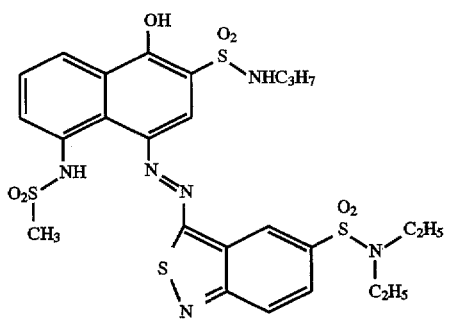
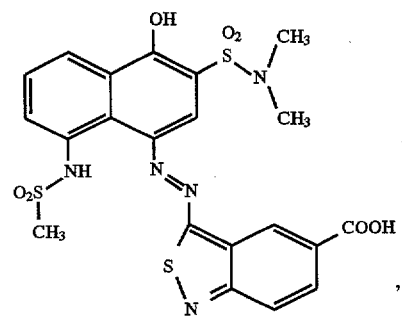
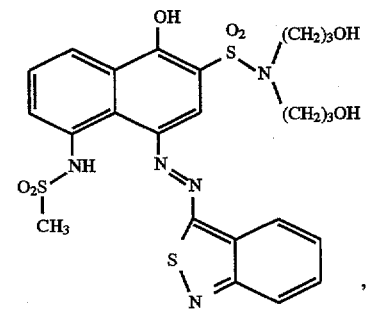
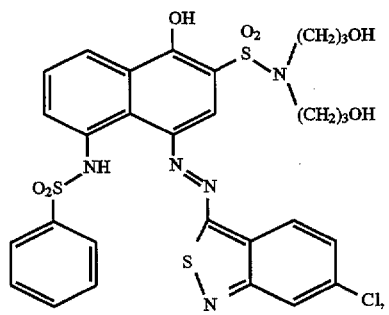
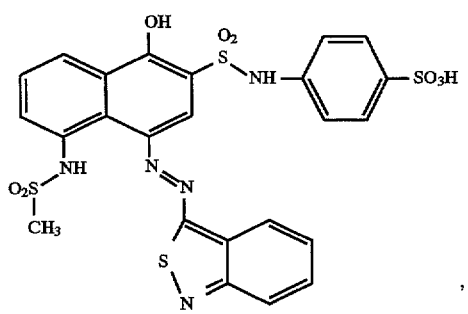
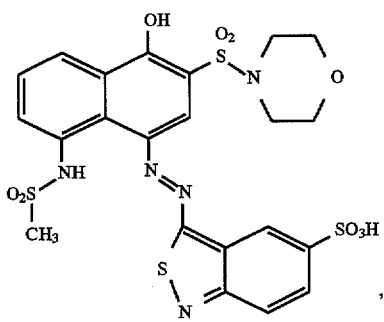
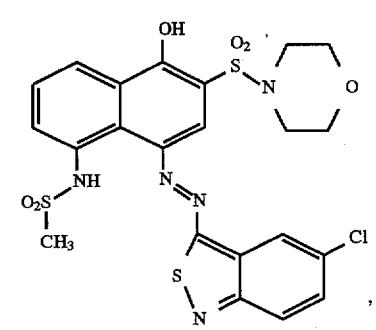
and
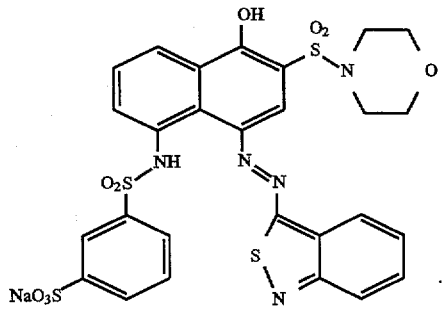
7. A compound as defined in claim 1 selected from the group consisting of:
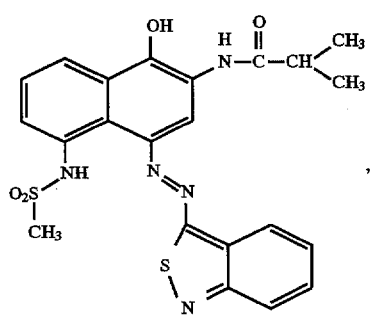

15
-continued
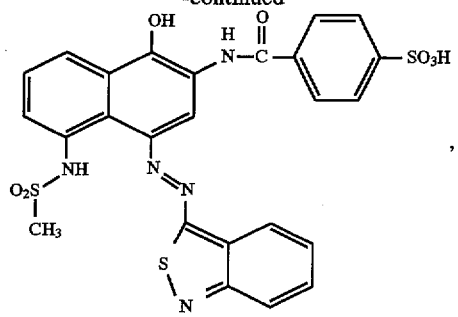
,
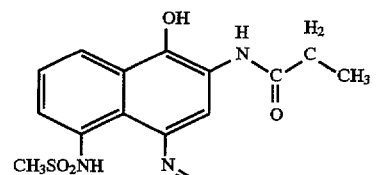
,
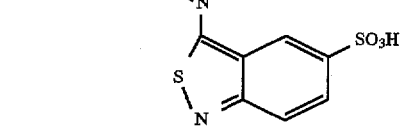
,
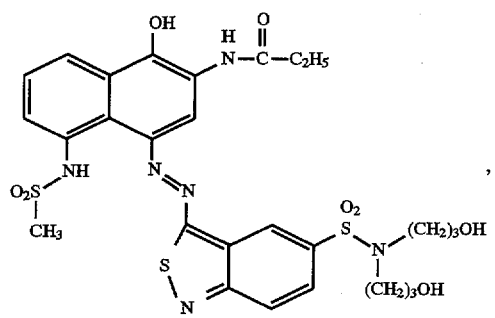
16
-continued
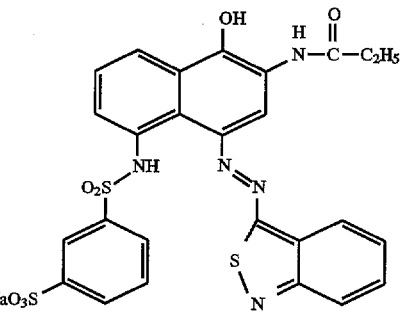
and
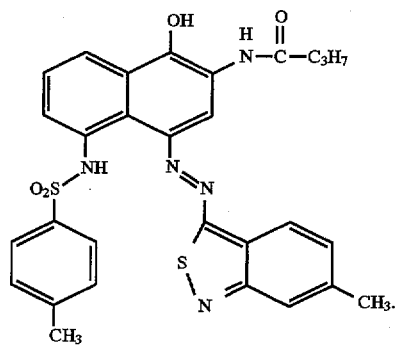
\* \* \* \* \*